United States Patent [19]

Ishibashi et al.

[11] Patent Number: 4,742,558
[45] Date of Patent: May 3, 1988

[54] IMAGE INFORMATION RETRIEVAL/DISPLAY APPARATUS

[75] Inventors: Satoshi Ishibashi; Kenji Ogura, both of Kanagawa; Susumu Yonezawa, Tokyo, all of Japan

[73] Assignee: Nippon Telegraph & Telephone Public Corporation, Tokyo, Japan

[21] Appl. No.: 698,927

[22] Filed: Feb. 7, 1985

[30] Foreign Application Priority Data

| Feb. 14, 1984 | [JP] | Japan | 59-25731 |
| Mar. 27, 1984 | [JP] | Japan | 59-59170 |
| Apr. 20, 1984 | [JP] | Japan | 59-79525 |

[51] Int. Cl.⁴ .................. G06K 9/36; G06F 3/153
[52] U.S. Cl. ......................... 382/56; 340/729; 340/728; 340/747
[58] Field of Search ............... 340/728, 747, 731, 729; 358/263, 260, 136, 283; 382/56

[56] References Cited

U.S. PATENT DOCUMENTS

| 3,757,037 | 9/1973 | Bialek | 340/711 |
| 3,984,671 | 10/1976 | Fletcher | 382/31 |
| 4,205,341 | 5/1980 | Mitsuya et al. | 358/260 |
| 4,225,850 | 9/1980 | Chang | 382/56 |
| 4,281,344 | 7/1981 | Mounts et al. | 358/136 |
| 4,319,267 | 3/1982 | Mitsuya et al. | 358/260 |
| 4,384,338 | 5/1983 | Bennett | 340/729 |
| 4,489,389 | 12/1984 | Beckwirth | 340/729 |
| 4,558,438 | 12/1985 | Jones | 340/728 |
| 4,598,372 | 7/1986 | McRoberts | 356/260 |
| 4,633,506 | 12/1986 | Kato | 382/56 |

OTHER PUBLICATIONS

D. P. Greenberg, Computer Graphics in Architecture, 1984, 396–404, Scientific American.

Primary Examiner—Leo H. Boudreau
Attorney, Agent, or Firm—Roberts, Spiecens & Cohen

[57] ABSTRACT

According to an image information retrieval/display apparatus, an original image is represented by a hierarchical structure from a global image of high level to a local image of low level in accordance with resolutions thereof. Only difference information between the images of the respective levels is coded and stored, so that the number of codes will not be increased. When an operator directly designates any partial area within the displayed global image, local images are sequentially retrieved. By adding and combining the difference information of the retrieved local image in the designated area within the global image, the desired local image can be displayed at high speed.

14 Claims, 17 Drawing Sheets

IMAGE INFORMATION RETRIEVAL/DISPLAY APPARATUS

BACKGROUND OF THE INVENTION

1. Field of the Invention

The present invention relates to an image information retrieval/display apparatus and, more particularly, to an apparatus for retrieving/displaying image information in an image information retrieval/display system for retrieving/displaying image information stored in a central processor or the like.

2. Description of the Prior Art

Systems for providing image information have been recently developed, and a system for providing natural images is also being developed. However, when these systems are required to display image information (global area image information) such as an aerophotograph which covers a wide area, resolution is degraded due to the limited number of pixels. The main requirement of an information retrieval/display system is that it be able to rapidly and easily retrieve and display any desired image portion within a given area.

With a conventional image information retrieval/display apparatus, global area image information is divided into a plurality of local area image information blocks each corresponding to the number of pixels for a resolution of the display unit. In addition, specific codes such as image numbers are assigned to the respective local area image information blocks which are then stored in a central processor or the like. When a local area image information block is to be retrieved, the code is used as a keyword, and the desired local area image information block is retrieved from a menu. Therefore, the local area image information blocks are displayed one by one on the display unit.

However, when image information such as aerophotographic information covering a wide area is to be retrieved, it is difficult to divide such image information into local area image information blocks such that each block can be represented by verbal information such as a keyword. A local area image information block selected from a menu in the conventional system often does not correspond to the desired one, and an additional retrieval operation must be performed. When retrieval is repeated, all codes constituting the local area image information block must be transmitted to the display unit, thus increasing response and display time. Furthermore, since the divided blocks are retrieved and displayed one by one, it is difficult to check the positional relationship between two adjacent divided blocks. In order to allow the checking of this positional relationship, an overlapping portion is provided between each two adjacent divided blocks, or a local area image information block at an intermediate position between the two adjacent divided blocks to be displayed must be synthesized. With these methods, the amount of stored data is increased, and the processing time of the central processor is prolonged, resulting in inconvenience.

In another conventional image information storage/retrieval apparatus for improving local area information block retrieval which uses a trial-and-error method, the global area image information is formatted into a hierarchical structure. According to this second conventional apparatus, a plurality of local area image information blocks at a given level correspond to a local area image information block of the next upper level. In this manner, image information blocks are subdivided into levels, from a level representing global image information to a level representing local image information. The information blocks are retrieved and displayed from the high-level blocks to the low-level blocks. However, with this apparatus, since a hierarchical partial positional relationship is established among the image information blocks of the respective levels, the amount of stored data representing these information blocks is increased. In addition, a local image at a desired position cannot be displayed, and only a local image at a fixed position can be displayed, resulting in inconvenience.

SUMMARY OF THE INVENTION

It is, therefore, a principal object of the present invention to provide an image information retrieval/display apparatus wherein image information is arranged in a hierarchical structure where global image information is at the top and local image information is at the bottom, only difference information components between adjacent levels are coded, thus requiring less information storage, any block in the global image can be directly designated to retrieve the local image, difference information concerning the local image information retrieved is added to and combined with the designated block information in the global image information, thereby displaying the local image at high speed.

It is another object of the present invention to provide an image information coder suitable for the image information retrieval/display apparatus described above.

It is still another object of the present invention to provide an image information decoder suitable for the image information retrieval/display apparatus described above.

In order to achieve the above objects of the present invention, there is provided an image information retrieval/display apparatus, comprising: coded image information storage means for storing coded image information arranged in a hierarchical structure having different levels corresponding to different resolutions thereof, the coded image information at levels excluding a highest level among the different levels in the hierarchical structure being coded difference information obtained such that a difference between the coded image information of a given level and the coded image information of a level adjacent to the given level is coded; decoding means for decoding the coded image information of a predetermined level which is read out from the coded image information storage means and generating display image information; displaying means for displaying the display image information decoded by the decoding means; designating means for designating a desired area of an image of the predetermined level which is displayed on the displaying means; and readout means for reading out from the coded image information storage means part or all of the coded image information which corresponds to the area designated by the designating means and which belongs to a level which is at least one lower than the predetermined level. The decoding means comprises: extracting means for extracting the decoded image information portion from the display image information displayed on the displaying means, the image portion corresponding to the area designated by the designating means; and combining means for combining the information extracted by the extracting means and the difference information of at least one lower level which is read out from the readout means to produce new display image information of the designated area.

With the above arrangement, the hierarchically coded image information is repeatedly retrieved and displayed from the high level to the low level in a manner in which a local image can be reproduced at high speed.

In an image information retrieval/display apparatus having the above arrangement according to an aspect of the present invention, the coded image information stored in the coded image information storage means is coded and divided into gray level components and resolution components in accordance with block truncation coding. In order to perform decoding of an intermediate image displayed while the coded image information blocks in the hierarchical structure are sequentially retrieved from the high-level blocks to the low-level blocks, only the resolution component as part of the difference information of the designated area is used as the difference information. In this manner, since only the difference information is used, retrieval/display of the intermediate image is performed at high speed, thereby decreasing the time required for discrimination as to whether the area is properly designated. When the area designation is discriminated to be true, the remaining component, i.e., the gray level component is added to display the local image of the corresponding level. However, when the designation is discriminated to be false, redesignation is performed.

An image information coder according to an aspect of the present invention comprises: first means for receiving image information having a pixel matrix, dividing the pixel matrix into blocks each having a smaller pixel matrix, calculating an average value of luminance or gray level signals of the pixels in each block, and coding the average value; and second means for dividing each block into subblocks each having a still smaller pixel matrix, calculating a difference between an average value of luminance or gray level signals of pixels in a given subblock and the average value of the block including the given subblock and coding the difference, the subblock in the second means being rewritten as a block, thereby repeating coding by the second means.

According to another aspect of the image information coder, the image coder further comprises third means for checking variations in all differences between the average values of blocks and the average values of the subblocks included in the respective blocks, coding the subblocks by the second means when the variations exceed a predetermined value but coding the subblocks with a typical value of all the differences and differences between the typical value and all differences or all subblocks with a zero difference when the variations fall within the predetermined value, the subblocks in the second and third means being rewritten as blocks, thereby repeating coding by the second and third means.

An image information decoder according to an aspect of the present invention comprises: temporary storage means for temporarily storing decoded image information; extracting means for extracting a portion designated by the designating means from the image information of a given level which is stored in the temporary storage means; and generating means for combining difference information between the given level and a lower level and generating decoded image information of the lower level.

The foregoing and other objects, features and advantages of the invention will be apparent from the following more particular description of an illustrated embodiment of the invention, as illustrated in the accompanying drawings.

DETAILED DESCRIPTION OF THE INVENTION

Principle of Operation of the Present Invention

Figure 1A:
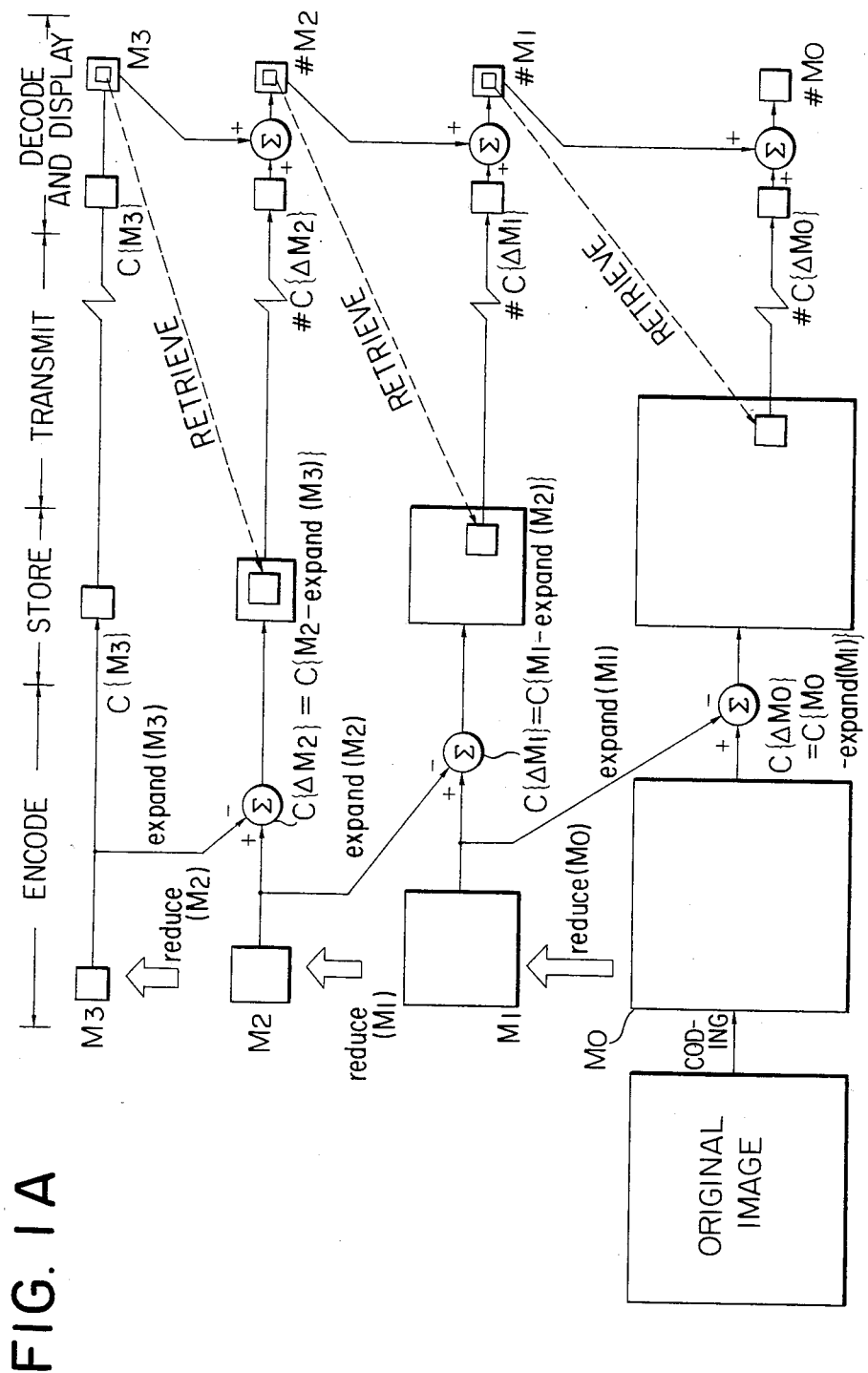
FIGS. 1A and 1B are respectively block diagrams for explaining the principle of the present invention.
Figure 1B:
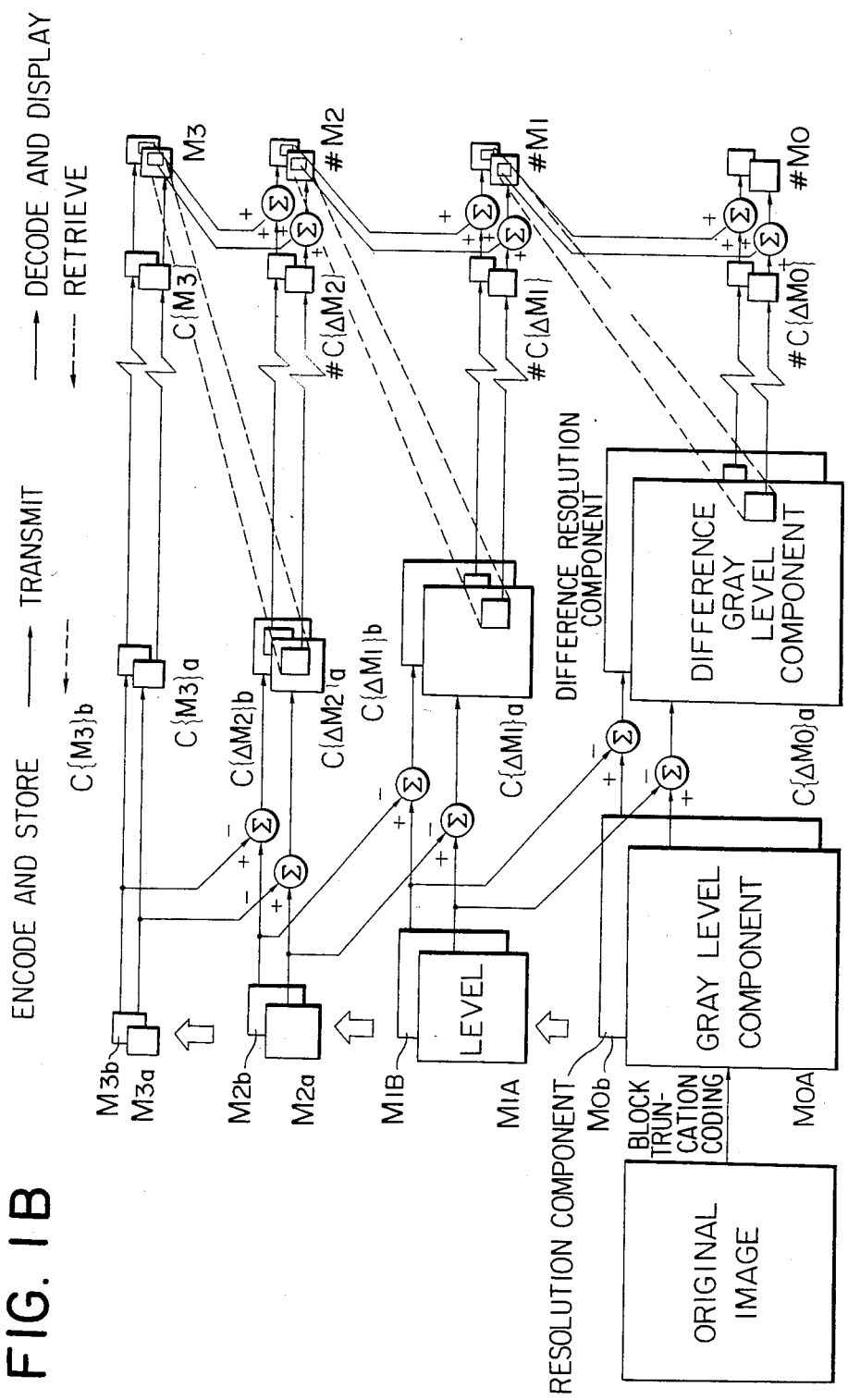

Figs. 1A and 1B are block diagrams for explaining the principle of the present invention. The basic principle of the present invention will be described in (1) coding and storage, (2) retrieval and (3) decoding and display with reference to FIG. 1A. An application of block truncation coding method will then be described with reference to FIG. 1B.

In the following description, a resolution for one pixel of the original image information for one display dot is given as "1"; and a resolution for displaying $2^l \times 2^l$ pixels as one displaying one dot is given as "$\frac{1}{2^l}$". Under these assumptions, an image having the resolution of 1 is called an image of level 0, and an image having the resolution of $\frac{1}{2^l}$ is called an image of level 1.

(1) Coding and Storage

The $n \times n$ pixels (e.g., n=2) of the original image information which are given as pixel data of a matrix type are defined as one block. The pixel data are arranged in a hierarchical structure from the lowest level 0 up to the highest level L in accordance with the following formula:

$$M_{l+1} = \text{reduce}(M_l) \qquad (1)$$

where $M_l$: the set of image data of level l l: the order of levels (positive integers 0 to (L−1))

reduce: to match one block of a plurality of pixels to a pixel of an upper level The difference information ΔM between the respective levels is obtained where a global image of the highest level is used as a reference image. By using only the difference information ΔM, the blocks of the respective levels are coded and stored:

$$C\{\Delta M_l\} = C\{M_l - \text{expand}(M_{l+})\} \qquad (2)$$

where expand: to correspond one pixel of a higher level to the respective pixels of one block at the lower level C{ }: encoding In this manner, the blocks in the highest level can be represented by the coded image information $C\{M_L\}$, and the blocks in the levels excluding the highest level can be represented by the coded difference information $C\{\Delta M_l\}$.

(2) Retrieval

The coded image information $C\{M_L\}$ of the highest level is transmitted to the display unit and is decoded to display the corresponding global image. Coded difference information $\#C\{\Delta M_{L-1}\}$ of a lower level, i.e., L−1 which corresponds to an area # designated by an operator is transmitted to the display unit. The display unit performs decoding (to be described later) and displays a local image of the designated area. When the operator wishes to retrieve an area different from the designated area, the display screen returns to the display of level L, and coded difference information of another area is transmitted to the display unit, thereby displaying a local image of the updated area.

The above operation is repeated for the next lower level until the most minute (most local) image of interest is finally retrieved.

(3) Decoding and Display

The coded image information $C\{M_L\}$ is used to decode the image of the highest level and is displayed on the display unit.

Part or all of the coded difference information $\#C\{\Delta M_l\}$ of a level l which corresponds to the designated area of the level l+1 is synthesized and decoded to display the partial image of the level l;

$$\#M_l = DEC\{\#M_{l+1} + C(\Delta M_l)\} \qquad (3)$$

where

: the portion corresponding to the designated area subjected to local image display DEC{ }: decoding In the retrieval process of the present invention, the coded difference information which corresponds to the designated area for local image display can be entirely or partially synthesized and decoded. When part of the difference data is used, the resolution of the displayed image is slightly degraded. However, such an image can be sufficiently recognized during the retrieval process. The utilization of part of the difference image information increases the processing speed, resulting in a more practical device.

In order to partially synthesize and decode the image information and the difference information, the coded information must be divided into main components and subcomponents such that synthesis and decoding of part of the image information can be performed by using only the subcomponents. In order to perform this function, block truncation coding is performed wherein the image information is divided into gray level components and resolution components which are then subjected to coding.

FIG. 1B is a representation for explaining the principle of operation wherein the image information is coded by block truncation coding, and only part of the coded difference information is utilized to decode the image information.

(1) Coding and Storage

With a hierarchical structure formation, coding and storage of the original image is performed such that the original image is divided into resolution components and gray level components which are then coded. More particularly, the gray level and resolution components of the image information of the highest level are coded and stored. The image information of the levels lower than the highest level can be decoded and stored in accordance with the corresponding difference gray level and resolution components.

Figure 2:
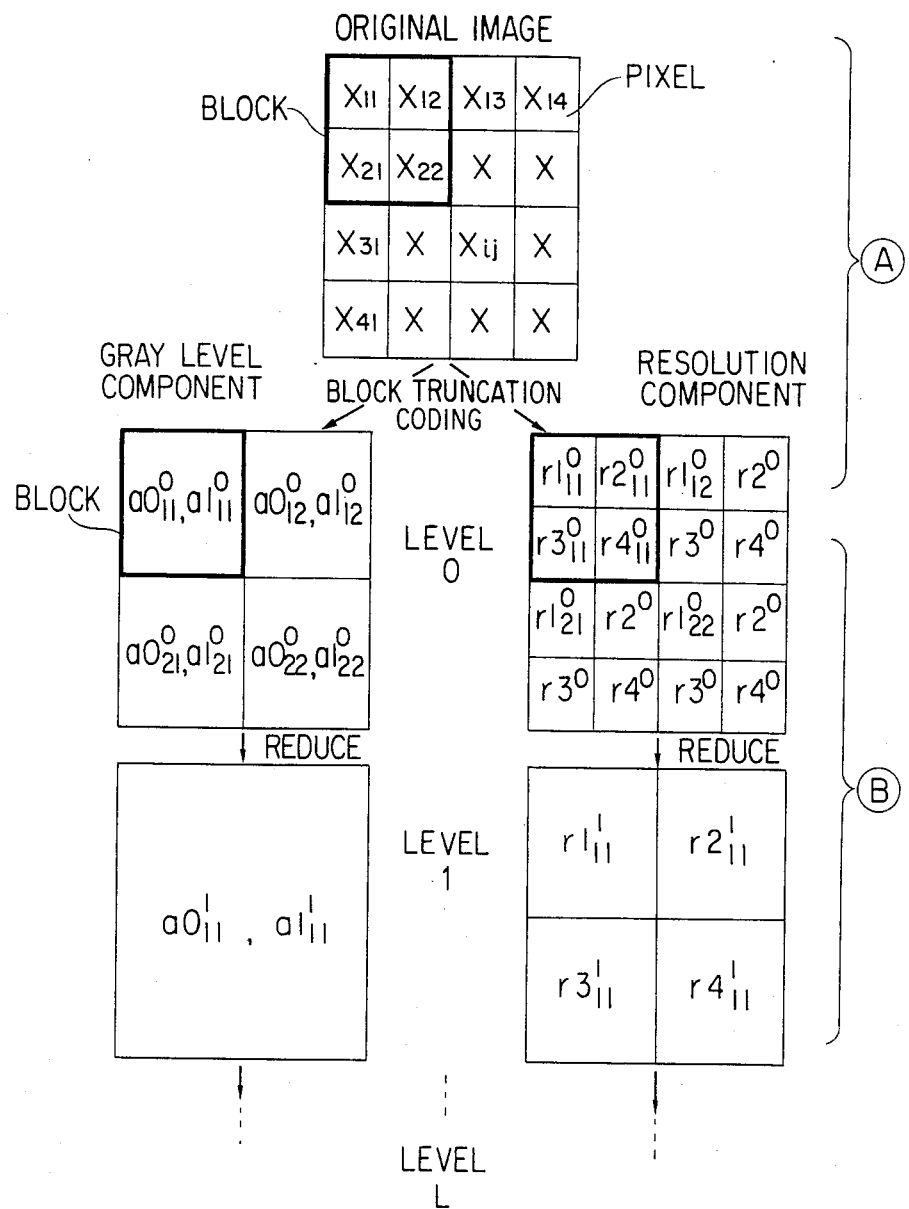
FIG. 2 is a representation for explaining the principles of block coding and hierarchical structure.

FIG. 2 is a block diagram for explaining the principle of operation for block truncation coding and hierarchical structure formation $M_{l+1} = \text{reduce}(M_l)$ for the original image.

The original image is divided into blocks each having 2×2 pixels. When an average luminance value in each block is defined as Xt, pixels having higher luminance values than the average luminance value Xt are assigned with flag 1, and pixels having lower luminance values than the average luminance value Xt are assigned with flag 0. Average luminances a1 and a0 for the sets of pixels assigned with flag 1 and flag 0 are calculated, respectively. Flag 1 and flag 0 are called resolution components, and average luminances are called gray level components. For example, a block $X_{911}$, $X_{12}$, $X_{21}$, $X_{22}$) is divided into a gray level component ($a0_{11}^0$, $a1_{11}^0$) and a resolution component ($r1_{11}^0$, $r2_{11}^0$, $r3_{11}^0$, $r4_{11}^0$) which are coded in accordance with block truncation coding, where r is flag 0 or flag 1. The luminance component a1 is assigned to the pixel of flag 1, and the luminance component a0 is assigned to the pixel of flag 0 in decoding (to be described later), thereby reproducing an image similar to the original image.

In hierarchical structure formation, elements $a0_{m,n}^{l+1}$ and $a1_{m,n}^{l+1}$ of the gray level component of a level l+1 are generally obtained by averaging one-block elements ($a0_{i,j}^l$, $a0_{i+1,j}^l$, $a0_{i,j+1}^l$, $a0_{i+1,j+1}^l$) and ($a1_{i,j}^l$, $a1_{i+1,j}^l$, $a1_{i,j+1}^l$, $a1_{i+1,j+1}^l$), of the immediately lower level l as follows:

$$a0_{m,n}^{l+1} = (\tfrac{1}{4})(a0_{i,j}^l + a0_{i+1,j}^l + a0_{i,j+1}^l + a0_{i+1,j+1}^l)$$

$$a1_{m,n}^{l+1} = (\tfrac{1}{4})(a1_{i,j}^l + a1_{i+1,j}^l + a1_{i,j+1}^l + a1_{i+1,j+1}^l) \quad (4)$$

where
i and j = 1, 3, ..., $N/2^{l+1}$]
m and n = 1, 2, ..., $N/2^{l+1}$

The element $r1_{m,n}^{l+1}$ of the resolution component of the level l+1 is defined in accordance with the values of the corresponding elements ($r1_{i,j}^l$, $r2_{i,j}^l$, $r3_{i,j}^l$, $r4_{i,j}^l$) of the lower level as follows:

$$r1_{m,n}^{l+1} = \begin{cases} 0: & \text{when the value of the component } (r1_{i,j}^l, \\ & r2_{i,j}^l, r3_{i,j}^l, r4_{i,j}^l) \text{ is one of } (0, 0, 0, \\ & 0), (0, 0, 0, 1), (0, 0, 1, 0), (0, 1, \\ & 0, 0), (1, 0, 0, 0), (0, 0, 1, 1), (0, \\ & 1, 0, 1) \text{ and } (0, 1, 1, 0) \\ 1: & \text{when the value of the component } (r1_{i,j}^l, \\ & r2_{i,j}^l, r3_{i,j}^l, r4_{i,j}^l) \text{ is one of } (1, 1, 1, \\ & 1), (1, 1, 1, 0), (1, 1, 0, 1), (1, 0, \\ & 1, 1), (0, 1, 1, 1), (1, 1, 0, 0), (1, \\ & 0, 1, 0) \text{ and } (1, 0, 0, 1) \end{cases} \quad (5)$$

The elements $r2_{m,n}^{l+1}$, $r3_{m,n}^{l+1}$ and $r4_{m,n}^{l+1}$ of the resolution component of the level l+1 can be calculated in accordance with the elements $rx_{i+1,j}^l$, $rx_{i,j+1}^l$ and $rx_{i+1,j+1}^l$ (x=1, 2, 3, 4,), respectively, in the same manner as described above.

Figure 3:
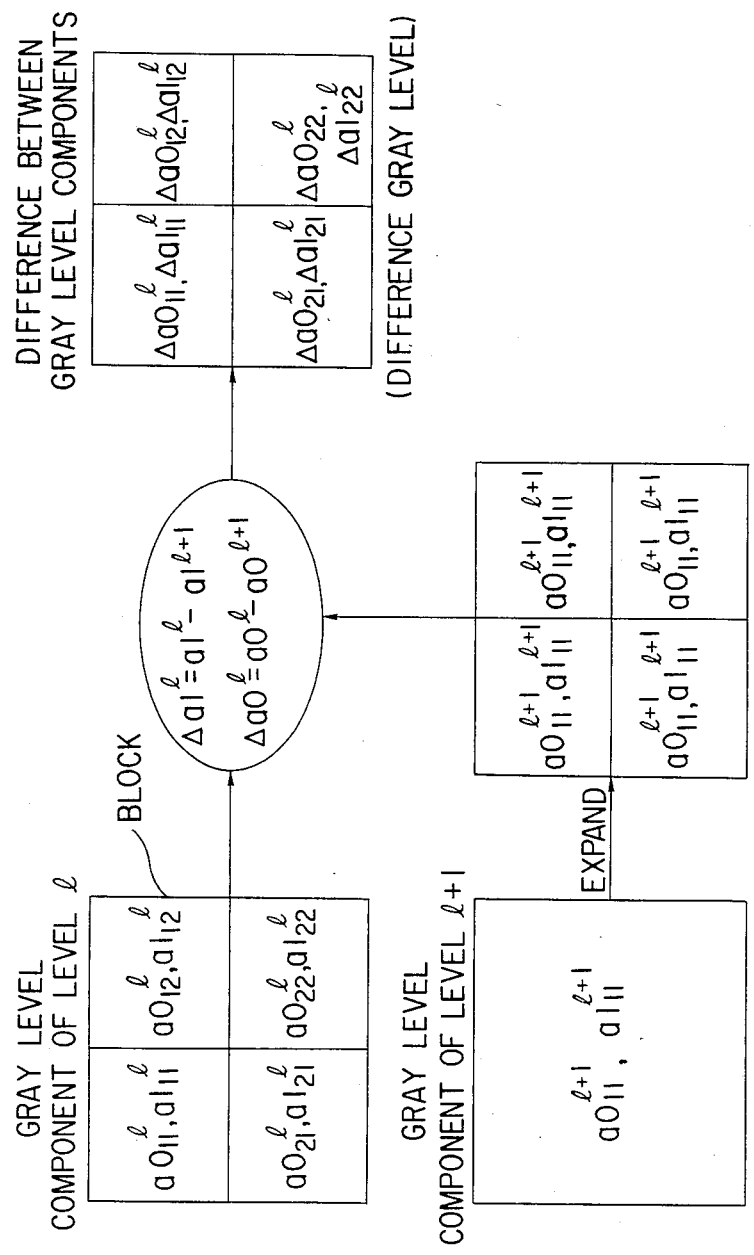
FIG. 3 is a representation for explaining a method of calculating a difference between gray level components.

The differences between the gray level components and between the resolution components of the levels excluding the highest level are calculated in accordance with the coded image information blocks of the respective levels which are obtained as described above. FIG. 3 shows a method of calculating a difference between the gray level components. Referring to FIG. 3, the gray level components $a0^{l+1}$ and $a1^{l+1}$ of the level l+1 are expanded and are subtracted from the corresponding gray level components of the level l to derive difference gray level components of the level l as follows:

$$\Delta a1^l = a1^l - a1^{l+1}$$

$$\Delta a0^l = a0^l - a0^{l+1} \quad (6)$$

Figure 4:
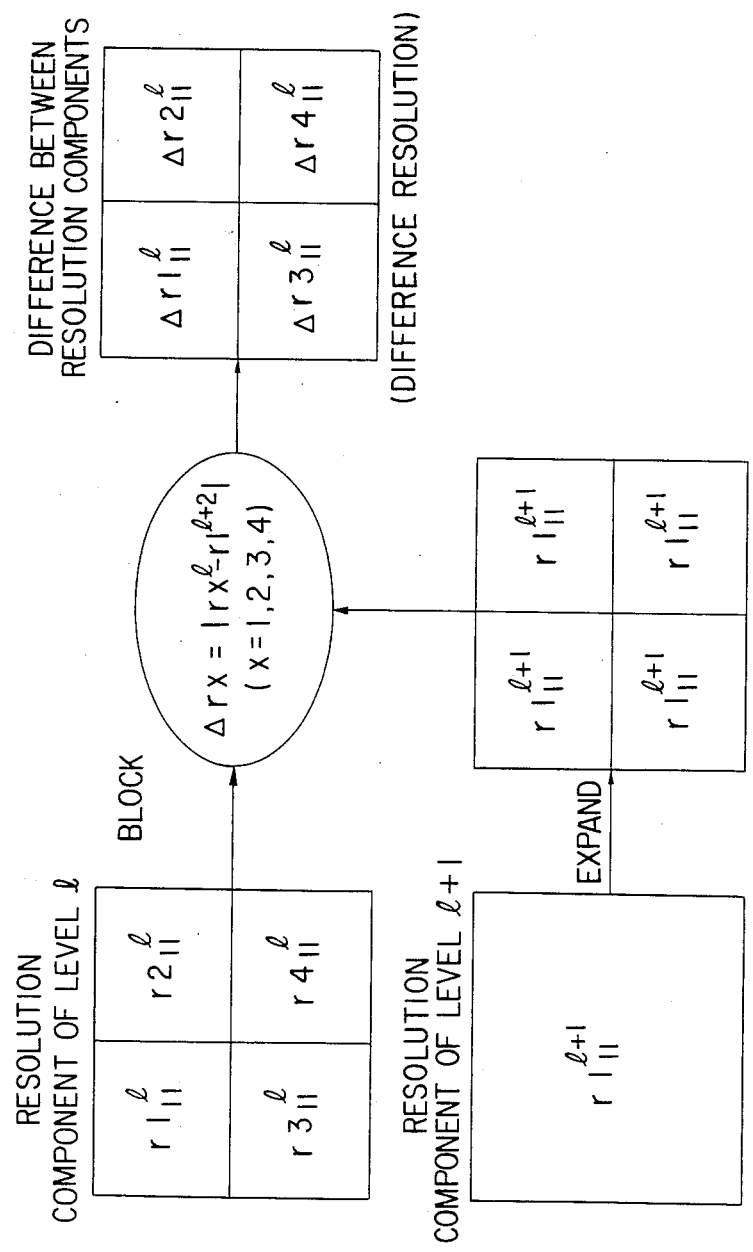
FIG. 4 is a representation for explaining a method of calculating a difference between resolution components.

FIG. 4 shows a method of calculating a difference between the resolution components. Referring to FIG. 4, the resolution component $r1^{l+1}$ of the level l+1 is expanded and is subtracted from the corresponding resolution component $rx^l$ of the level l, and the absolute value of the result is obtained to derive the difference resolution component $\Delta rx^l$ of the level l as follows:

$$rx^l = |rx^l - r1^{l+1}| \quad (x=1, 2, 3, 4) \quad (7)$$

The gray level and resolution components of the highest level, and the difference gray level and resolution components of the levels excluding the highest level are stored in a memory. When a given level and a given area are designated at the time of data retrieval, corresponding gray level and resolution components can be read out.

(2) Retrieval, Decoding and Display

The coded image stored in the memory can be retrieved and displayed in the following manner. A case will be exemplified wherein the highest level is 3 as shown in FIG. 3.

(a) The image information, i.e., the gray level component C{M_3}a and the resolution component C{M_3}b of level 3 are transmitted to a terminal device or display unit. These gray level and resolution components are decoded to display an image of level 3. In this case, the image of level 3 has a lowest resolution, but the original image can be entirely displayed. Decoding is performed such that the pixels of flag 1 in the resolution component are assigned to the luminance a1 of the gray level component and the pixels of flag 0 in the resolution component are assigned to the luminance a0, thereby reproducing an approximation of original image.

(b) The difference information (i.e., at least one of the difference gray level component #C{ΔM_2}a and the difference resolution component #C{ΔM_2}b of level 2) of a portion corresponding to an area # designated by the user on the display screen for level 3 is retrieved and transmitted to the terminal device. The transmitted component is decoded to display an image of the designated area # at level 2.

(c) local areas are sequentially designated to retrieve images of lower levels. However, in this case, only the difference resolution component #C{ΔM_1}b among all of the difference information of level 1 is added and decoded for an intermediate image, which is between level 2 and level 1. The resolution of the intermediate image is lower than that of the original image of level 1, but this intermediate image provides the edges which are important for the recognition of the images (information concerning a part of which brightness is substantially varied) so as to allow a rough recognition of the image of level 1. Only one type of difference information is transmitted and the number of pieces of information to be processed in data transmission and decoding can be decreased, so that the intermediate image can be displayed at high speed.

Figure 5:
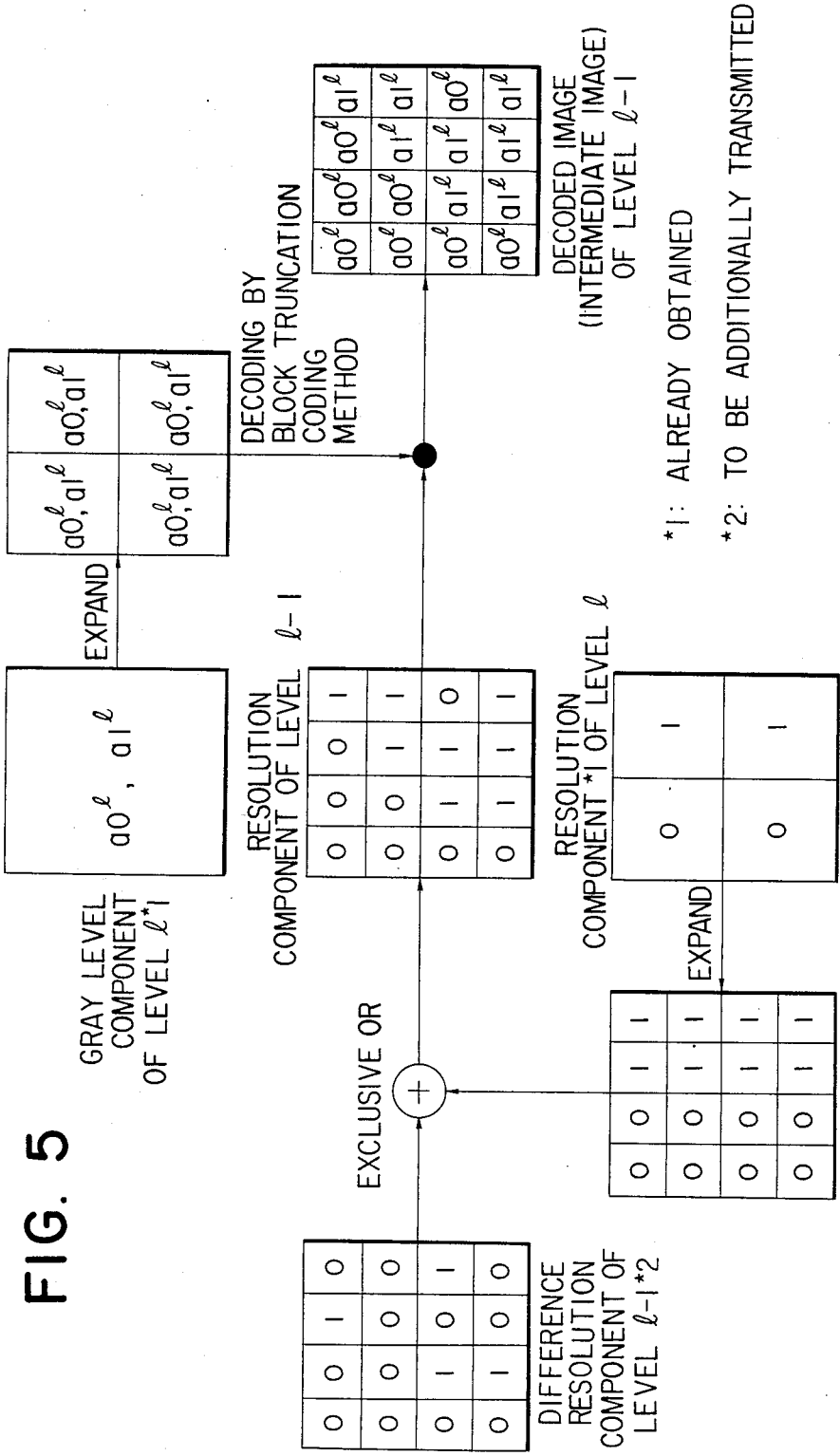
FIG. 5 is a representation for explaining a method of decoding an image of level l-1 in accordance with the already obtained gray level component of level l and a difference resolution component added thereto by data transmission.

FIG. 5 shows a general method of decoding an image of level l-1 in accordance with the already obtained gray level component of level l, the resolution component of level l, and the additional difference resolution component of level l-1. In the example described above, l=2. As is apparent from FIG. 5, the gray level components $a0^l$ and $a1^l$ of the level l are expanded, and the expanded components are used in place of the gray level component of level l-1. In other words, the gray level component a0 of the level l is assigned to all elements of flag 0 in the resolution component of the level l-1 which is obtained from the resolution component of level l, and the difference resolution component of level 1, and the gray level component a1 of the level 1 is assigned to all elements of flag 0, thereby obtaining a decoded image (i.e., the intermediate image) of the level 1-1

(d) When the operator judges that a retrieval error is present by visually observing the displayed intermediate image, the display screen returns to that of level 2, and the operator designates another area.

(e) Only the difference resolution component of the redesignated area in level 1 is transmitted to the terminal device, and a new intermediate image, which is between level 2 and level 1, corresponding to the redesignated area in level 2 is displayed.

(f) When the operator judges by visually observing the displayed intermediate image that proper retrieval has been performed, the difference gray level component $\#C\{\Delta M_1\}a$ of the designated area is transmitted to the terminal device, thereby displaying the local image of level 1.

(g) The same operation as described above is performed between level 1 and level 0, so that a local image of level 0 which has the same resolution as that of the original image can be retrieved and displayed. In the above description, the images are retrieved one by one from the higher level to the lower level. However, retrieval and display can be performed by jumping from level 3 to level 0.

According to the present invention, the original image information is hierarchically stored from global area image information to local area image information. A desired area in the displayed image is directly designated to retrieve and display the local image by adding only the difference information. All or some of components of the difference information can be added. When some of the components are added, the resultant image has a lower resolution than that of the image when all component added, but a high-speed display can be performed, thereby allowing a retrieval error to be quickly recognized. Therefore, the operator can retrieve and display an image of any local portion of the original image when the image information is directly entered while checking the correspondence between the global image and the local images. Furthermore, when the global area image information is temporarily stored in the display unit, the global image can be immediately displayed again for retrieval without being retransmitted from the central processor. Therefore, even if a retrieval error occurs, retrieval need not be restarted from the beginning.

The present invention will be described with reference to a preferred embodiment.

DESCRIPTION OF THE EMBODIMENT

Figure 6:
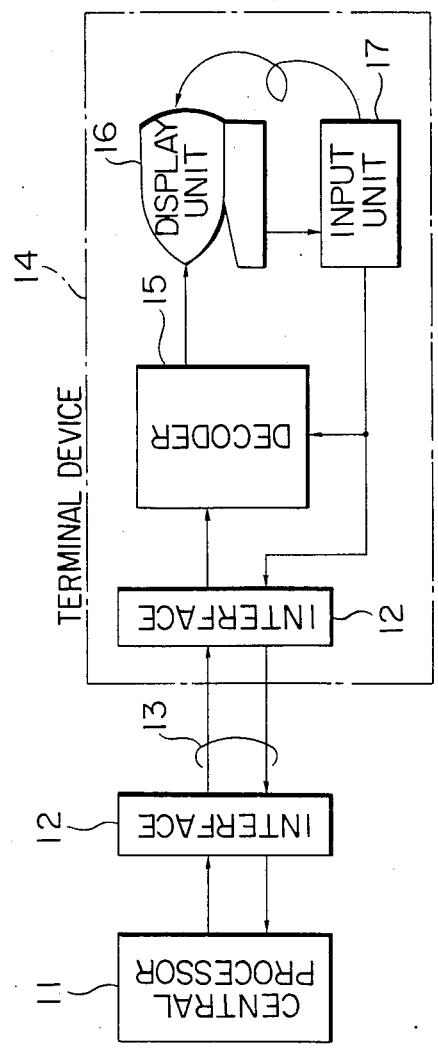
FIG. 6 is a block diagram of an image information retrieval/display apparatus according to an embodiment of the present invention.

FIG. 6 is a block diagram schematically showing an image information retrieval/display apparatus according to an embodiment of the present invention. The apparatus comprises a central processor 11, an interface 12, transmission lines 13, a terminal device 14, a decoder 15, a display unit 16 and an interactive control unit 17.

The central processor 11 stores and reads out coded image information in accordance with a level identifier and a key address signal for extracting an area designated from the interactive control unit 17. The level identifier identifies a level of image information to be displayed. The readout codes are transmitted to the terminal device 14 through the interface 12 and the transmission line 13. The transmitted codes are supplied to the decoder 15 in the terminal device 14 through the interface 12. The decoder 15 decodes the codes of the information representing one image on the display unit 16 in a manner to be described later. The decoded information is displayed on the display unit 16. When the terminal user or operator designates an area in the displayed image, the interactive control unit 17 generates a level identifier and a key address signal which are supplied to the central processor 11. The interactive control unit 17 also supplies a control signal to the decoder 15, thereby repeating decoding and display.

Figure 7:
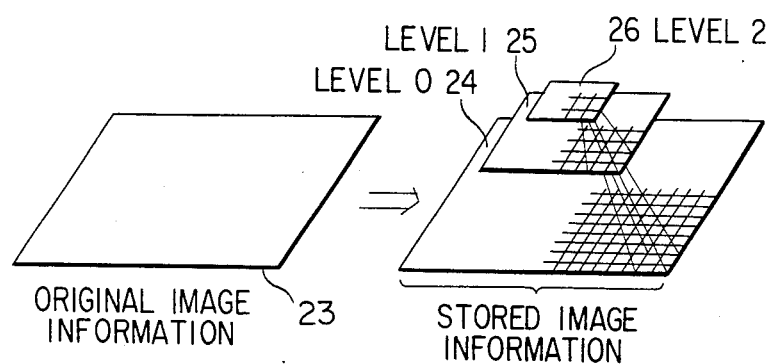
FIG. 7 is a representation showing a hierarchical structure of original image information according to the apparatus shown in FIG. 6.

FIG. 7 is a representation showing a hierarchical structure of image information stored in the central processor. In this case, unlike the previous one wherein the image information is divided into gray level and resolution components, only luminance information is used. In general, at least two pixels of a local image 24 obtained in correspondence with original image information 23 are represented by one pixel, thereby constituting global images 25 and 26. The most minute (local) image is represented by level 0, and larger (global) images are represented by level 1, level 2, ..., level L (where L is a positive integer, L=2 in FIG. 4). Information of level i (i=0, 1, ..., N−1 where N is a positive integer) is given as difference data between the level i and the level (i+1). In this manner, the hierarchical structure does not require an increase in memory capacity. Referring to FIG. 7, the global image 26 of level 2 is constituted such that 4×4 pixels of the original image information are represented by one pixel by using average luminance information or the like. Similarly, the global image 25 of level 1 is constituted such that 2×2 pixels of the original image information are represented by one pixel by using average luminance information or the like. The local image (the lowest level image) 24 of level 0 has the same number of pixels as that of the original image information. The image information of level 1 is stored in the form of difference information between the average luminance information of 4×4 pixels in level 2 and the average luminance information of 2×2 pixels. The image information in level 0 is stored in the form of difference information between the average luminance information of 2×2 pixels in level 1 and the original image information.

Figure 8:
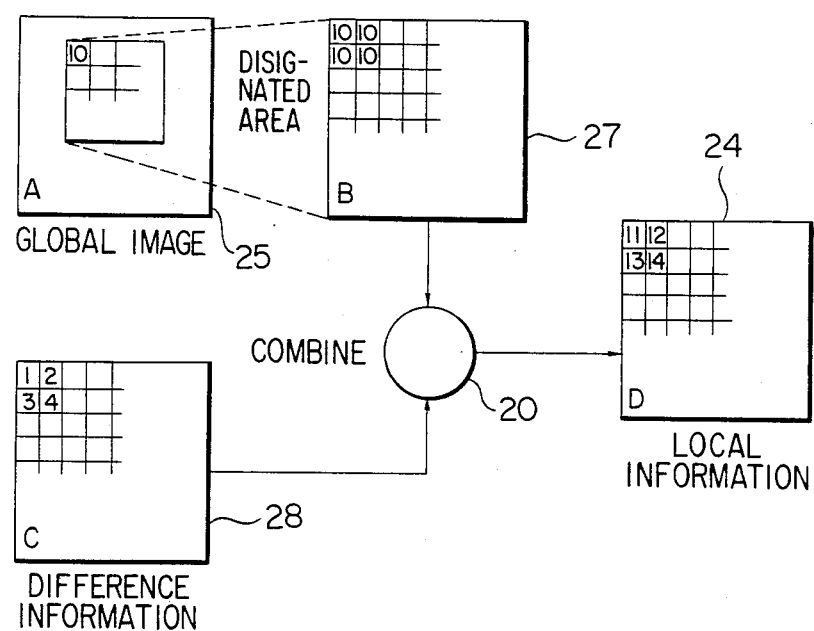
FIG. 8 is a representation for explaining local image information synthesis.

FIG. 8 shows a method of decoding the image information stored in the hierarchical structure of FIG. 7. Referring to FIG. 8, one-pixel information of the global image 25 corresponding to the designated area in A is expanded to pixels of information 27 in B which correspond to a plurality (4 in FIG. 7) of components of difference information 28. The pixels in B are added to the components of the difference information 28, respectively, to obtain a plurality (4 in FIG. 5) of pixels in D. Therefore, one-pixel information in the global image 25 is represented by a plurality of pixels of a local image 24. Each numeric value in FIG. 8 represents a luminance component value.

Figure 9:
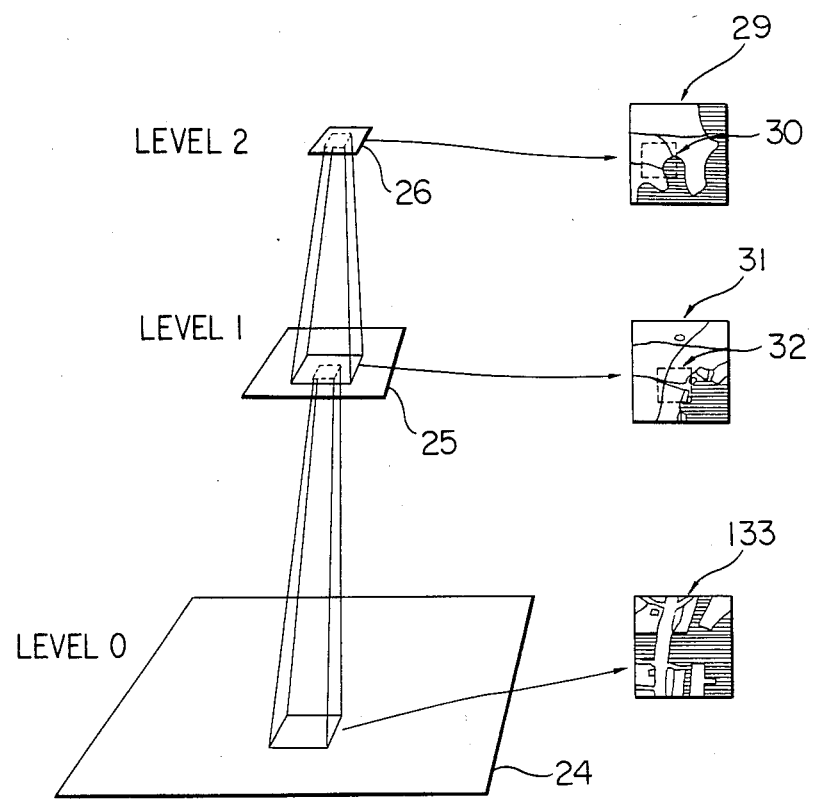
FIG. 9 is a representation for explaining the process of retrieval according to the present invention.

FIG. 9 is a representation for explaining retrieval and display of the image stored in the hierarchical structure. It is impossible to simultaneously display all image information blocks with the number of pixels of level 0. First, a global image (highest level image) 26 is displayed on the display unit, as indicated by an illustration 29. Second, an intermediate image 25 of a designated area 30 is displayed on the display unit, as indicated by an illustration 31. Finally, a local image 24 of a designated area 32 is displayed on the display unit, as indicated by an illustration 33.

The original image is exemplified by an image such as an aerophotograph covering a wide area. However, the present invention can also be applied to a case wherein independent local images constituting a global image can be selectively extracted.

Coder

Figure 10:
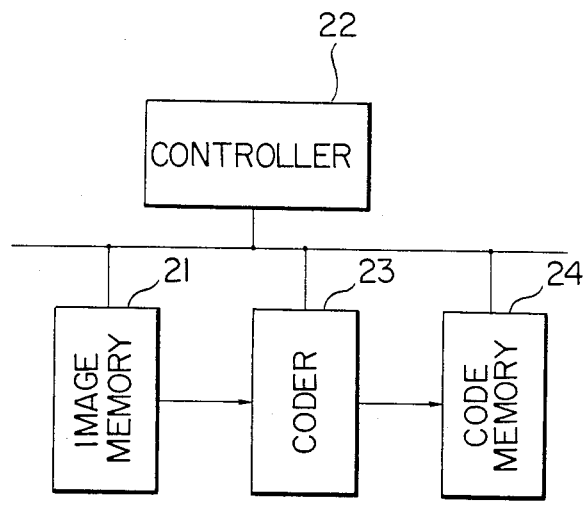
FIG. 10 is a block diagram of a coding arrangement in a central processor 11 of the apparatus of FIG. 6.

FIG. 10 schematically shows a coding arrangement in the central processor 11. This arrangement comprises an image memory 21, a controller 22, a coder 23 and a code memory 24. The image memory 21 stores original image information as values (luminance or density signal values of pixels) of pixels arranged in a matrix form. The coder 23 determines the number of pixels included in each of the blocks of the original image information and corresponding to the number of display pixels in the display unit, and requests an output of pixel values of one block to the controller 22. The controller 22 controls readout operation of the image memory 21, and the pixel values of one block are supplied to the coder 23. The coder 23 temporarily stores the input pixel values and sequentially encodes the values from the global image codes (higher level codes) to the local image codes (lower level codes) in accordance with the block truncation coding method illustrated in FIG. 1A or 1B. The codes are then supplied to the code memory 24. The code memory 24 stores the codes in response to a write control signal from the controller 32. When coding of one block is completed, the coder 23 requests the pixel values of the next block. The above coding operation is repeated for all blocks.

Figure 11:
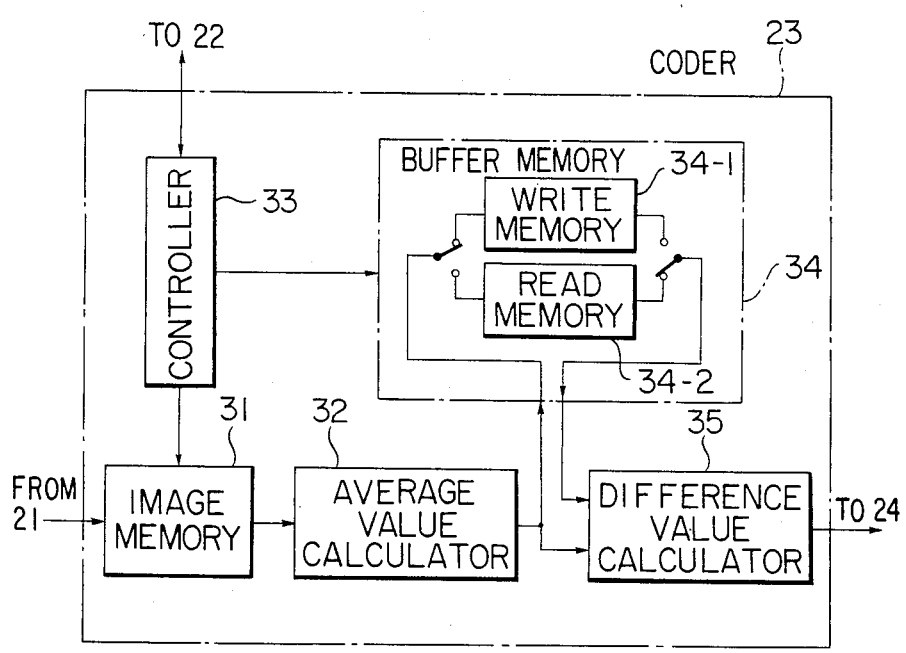
FIG. 11 is a block diagram of a coder of the arrangement in FIG. 10.

FIG. 11 is a block diagram showing an arrangement of the coder 23. The coder 23 comprises an image memory 31, an average value calculator 32, a control unit 33, a buffer memory 34 and a difference value calculator 35.

Figure 12:
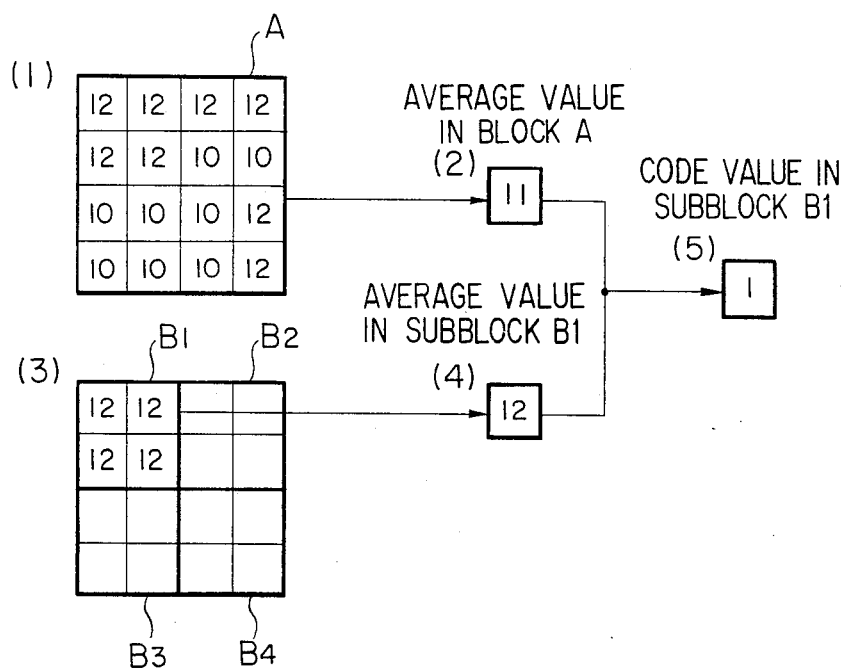
FIG. 12 is a representation showing a one-block original image portion supplied to the coder and the corresponding coded image portion generated therefrom.

FIG. 12 is a representation showing the input original image block and the corresponding coded image block. A rectangle A is defined by thick lines in (1) of FIG. 12 and represents a block. Rectangles B1, B2, B3 and B4 defined by thick lines in (3) of FIG. 12 represent subblocks in the block A, respectively. Small rectangles in (1) and (3) of FIG. 12 represent pixels. A numeric value in each small rectangle represents a pixel value. Squares (2), (4) and (5) represent blocks, respectively. Numeric values in blocks (2) and (4) represent the average value of the block and the average value of the subblock B1, respectively. A numeric value in block (5) represents a code value of subblock B1.

Assuming that the number of pixels in the block A is 4×4, the operation of the coder 23 will be described in detail with reference to FIGS. 11 and 12. The coder 23 receives the pixel values of the 4×4 pixels in the block A in (1) of FIG. 12. These pixel values are temporarily stored in the image memory 31. The buffer memory 34 comprises two memories 34-1 and 34-2 which are independently operated from each other. One of the memories 34-1 and 34-2 is set in the write mode (write side), and the other is set in the read mode (read side). Every time coding of one block at one level is completed, the write and read modes of the memories 34-1 and 34-2 are changed. In the initial state, the read memory is cleared to zero. The values of all pixels (16 pixels) in the block A are supplied to the average value calculator 32. An average value of these 16 pixel values is calculated (FIG. 12(2)). The average pixel value of the block A is stored in the write memory of the buffer memory 34 and is supplied to the difference value calculator 35. At the same time, the controller 33 causes the content of the read memory to be supplied to the difference value calculator 35. However, in this case, the content is set to zero. Therefore, the average value of the block A is generated as the global image code (the highest level code). The controller updates the read address of the image memory 31. An average value of the 2×2 pixels in the subblock B1 of block A (FIG. 12(3)) is calculated by the average value calculator 32 (FIG. 12(4)). The controller 33 then switches the write and read modes of the memories in the buffer memory 34. The average value of the block A is read out, and the difference value calculator 35 calculates a difference value between the average value of the block A and the average value of the subblock B1 (FIG. 12(5)). The difference value is generated as a local image code (second level). The average value of the subblock B1 is stored in the buffer memory 34 and is read out when the next level is coded. Subblocks B2, B3 and B4 can be coded in the same manner as described above. When second level coding is completed, these subblocks are then regarded as blocks which are then further divided into a plurality of subblocks. Coding is repeated until the number of pixels in the subblock is one. When coding for all levels in the level A is completed, the next block is subjected to coding.

Figure 13:
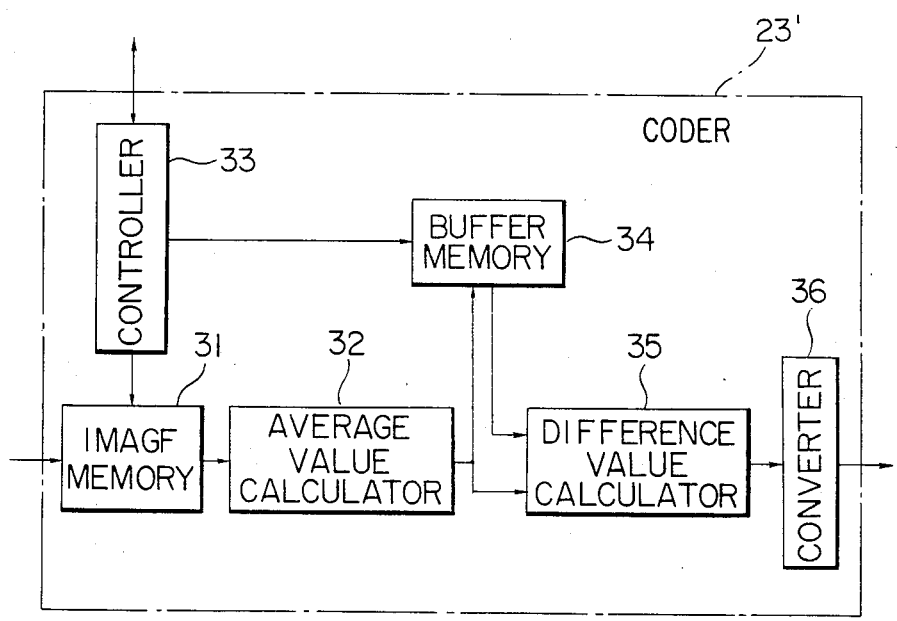
FIG. 13 is a block diagram showing another arrangement of the coder having a converter for decreasing the number of bits of the output code.

FIG. 13 shows another arrangement of a coder constructed such that a converter 36 is added to the above-described coder. The basic operation of the coder of FIG. 13 is substantially the same as that of FIG. 12. Since the converter 36 is added in the arrangement of the coder of FIG. 13, output codes can be compressed. The converter 36 performs one of two switchable operations. More particularly, the converter 36 temporarily stores codes (difference values) generated in units of blocks from the difference value calculator 35. According to a first operation, when variations in the codes temporarily stored in the converter 36 exceed a predetermined range, the codes are generated without modification. However, when variations fall within the predetermined range, the code values are regarded as zero, and an output code having a smaller number of bits than that of the input code is generated. According to a second operation, when variations in all temporarily stored codes exceed the predetermined range, the codes are generated without modification. However, when variations fall within the predetermined range, an average code is selected as a typical code, differences between the typical code and other input codes are calculated, and an output code having a smaller number of bits than that of the input code is generated in accordance with the typical code and the difference codes. These first and second operations can be switched over in accordance with the type or the like of image information. The upper and lower limits defining the predetermined range described above can be easily updated by externally entering suitable parameters.

Figure 14A:
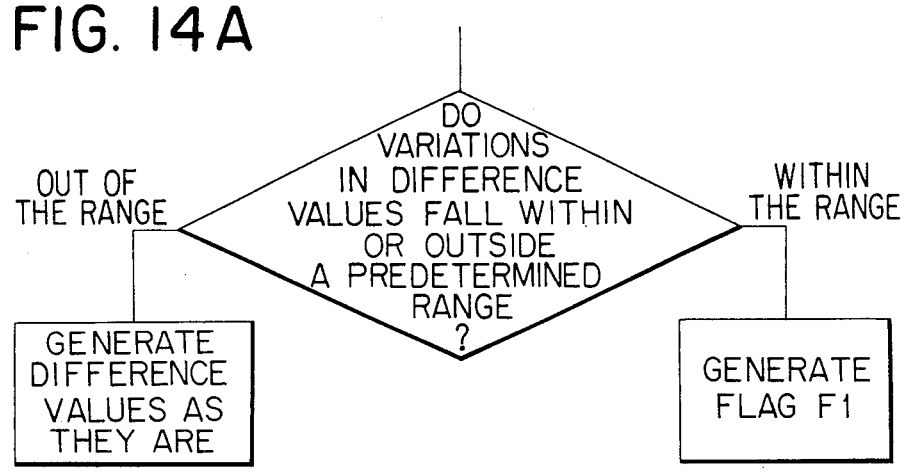
FIGS. 14A and 14B are respectively flow charts for explaining the operation of the converter of FIG. 13.
Figure 14B:
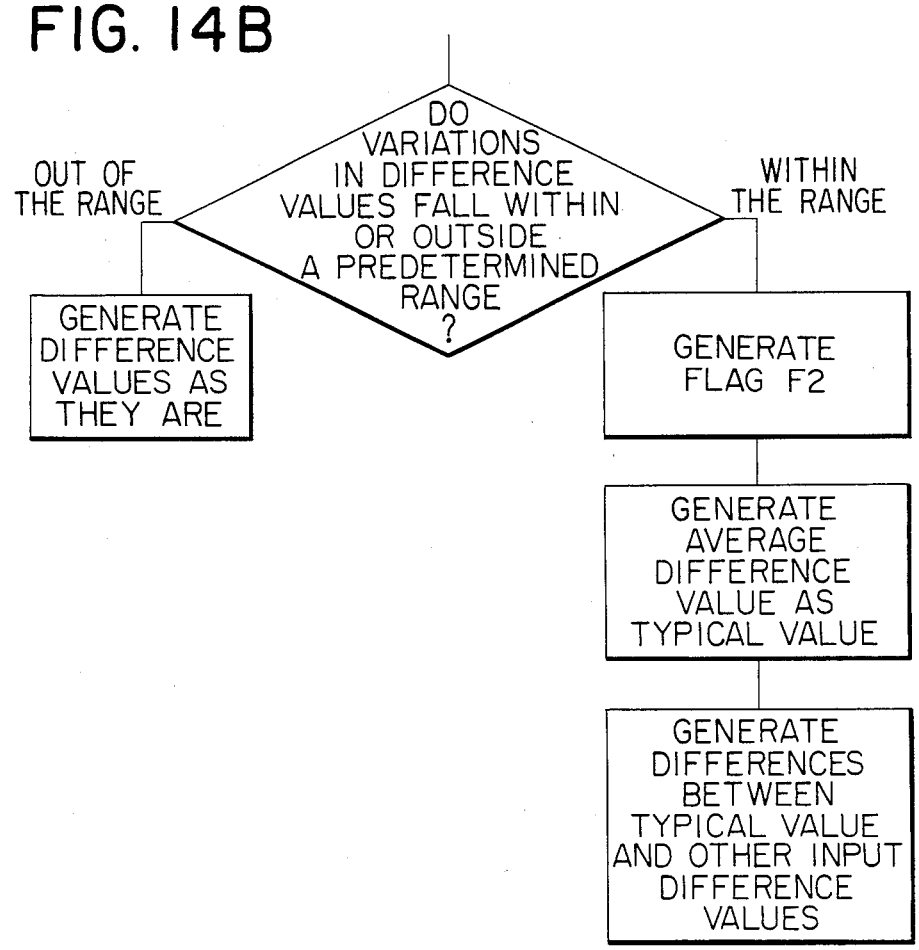

FIGS. 14A and 14B are respectively flow charts for explaining the operation of the converter 36.

The flow chart of FIG. 14A is concerned with the first operation. Variations in the difference values from the difference value calculator 35 are compared with the limits defining the predetermined range. When a variation exceeds the predetermined range, the input difference value is generated without modifications. However, when a variation falls within the predetermined range, flag F1 representing a code value "0" is generated.

The flow chart of FIG. 14B is concerned with the second operation. The variations in the difference values from the difference value calculator 35 are compared with the predetermined range in the same manner as in the first operation. When a variation exceeds the predetermined range, the input difference value is generated without modification. However, when the variation falls within the predetermined range, flag F2 is generated, the average value of the difference values is selected as a typical difference value and is generated, and difference values between the typical difference value and other input difference values are generated.

Figure 15:
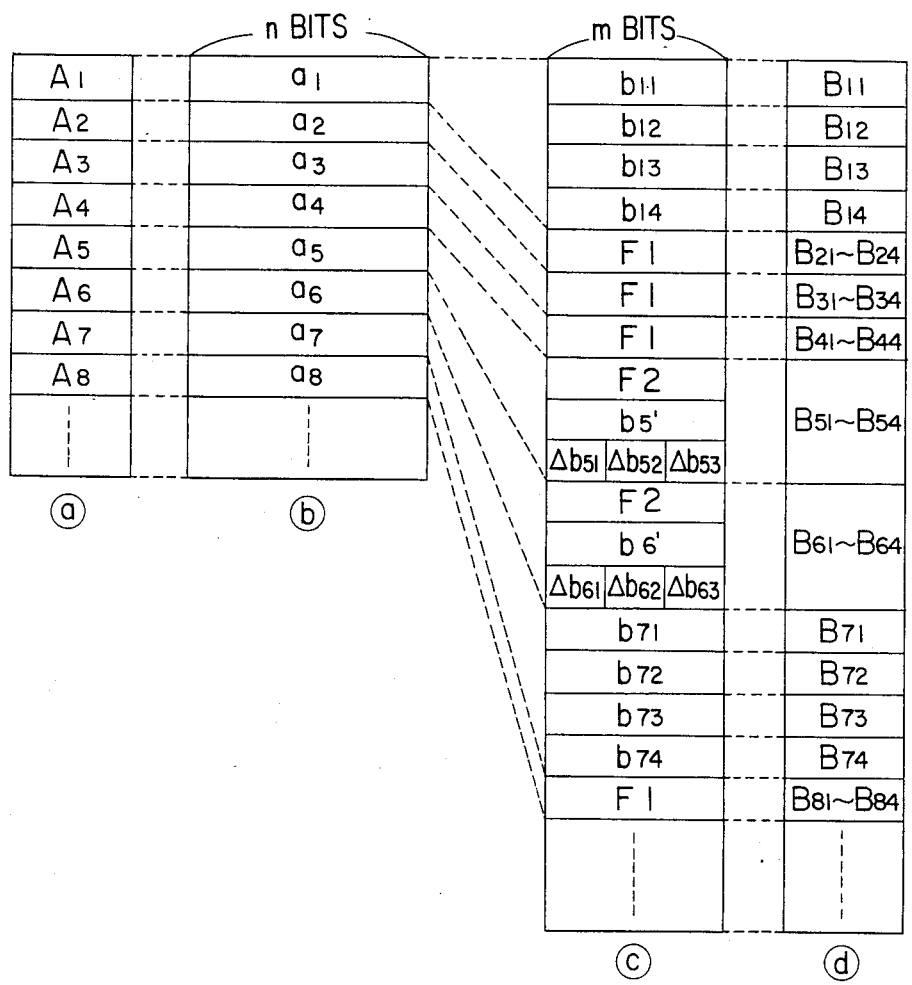
FIG. 15 is a data table for explaining the operation of the converter of FIG. 13.

FIG. 15 shows an operation of the converter 36. Reference symbol $A_i (i=1, 2, 3, ...)$ in column ⓐ of FIG. 15 denotes each block. Reference symbol $a_i (i=1, 2, 3, ...)$ in column ⓑ of FIG. 15 represents an average luminance or density value of the block $A_i$. Column ⓒ shows a code value of each subblock which is generated from the converter 36; and column ⓓ shows subblocks $B_{i1}$, $B_{i2}$, $B_{i3}$ and $B_{i4}$ $(i=1, 2, 3, 4, ...)$ corresponding to the block $A_i$. The code values of the subblocks $B_{i1}$, $B_{i2}$, $B_{i3}$ and $B_{i4}$ are represented by $b_{i1}$, $b_{i2}$, $b_{i3}$ and $b_{i4}$ in column ⓒ, respectively.

When variations in difference values of the respective subblocks in a block falls within the predetermined range, the codes of the subblocks are represented by first operation flags F1 representing that the difference values are all zero, as shown in subblocks $B_{21}$ to $B_{24}$, $B_{31}$ to $B_{34}$, $B_{41}$ to $B_{44}$ and $B_{81}$ to $B_{84}$. Otherwise, as described with reference to the second operation, the codes are coded by the selected typical difference value $b_j'$, difference values $\Delta b_{j1}$, $\Delta b_{j2}$ and $\Delta b_{j3}$ between the typical differen value $b_j'$ and other input codes, and the second operation flags F2, as indicated by subblocks $B_{51}$ to $B_{54}$, $B_{61}$ to $B_{64}$.

In this manner, the code values of the sunblocks in column ⓒ are represented by the difference values, so that the output codes can be expressed by a smaller number of bits than that of the average value in the block.

Figure 16:
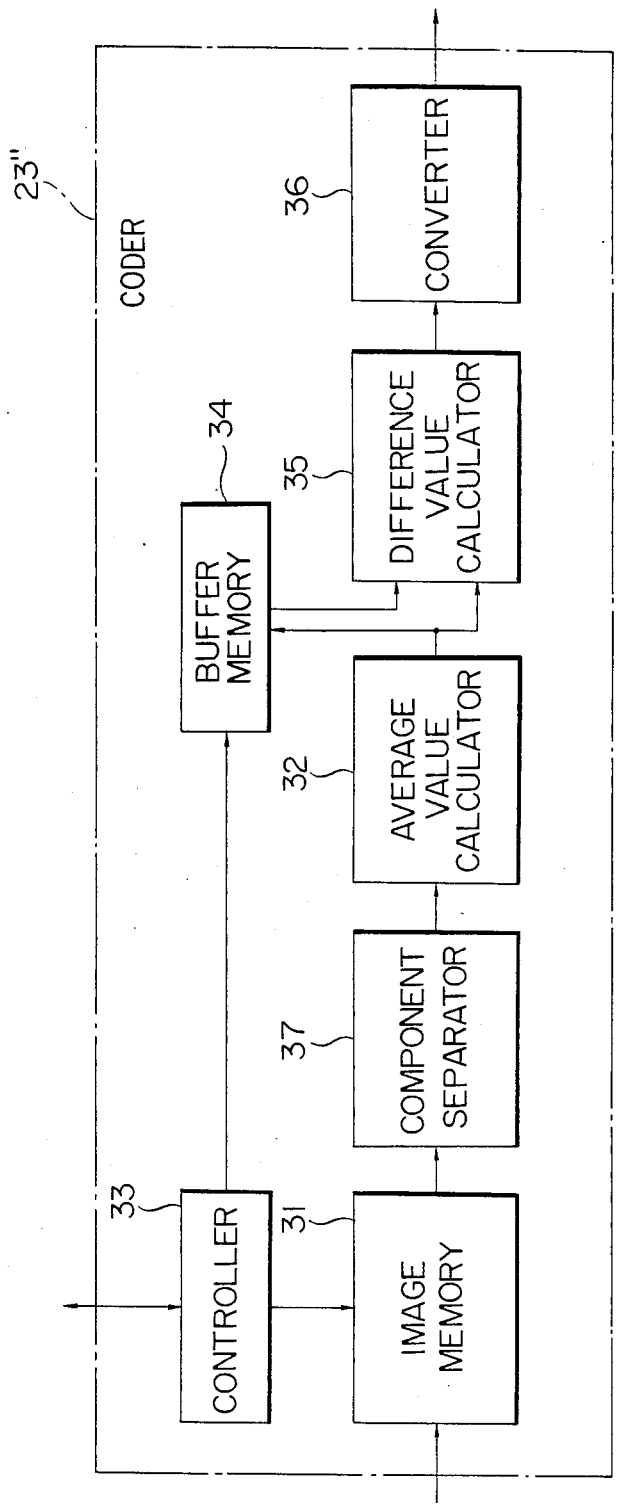
FIG. 16 is a block diagram showing still another arrangement of the coder for coding color image information.

The monochromatic multi-value image information coder is exemplified in the above description. However, the arrangement of the coder is not limited to this. As shown in FIG. 16, a component separator 37 is added to the arrangement shown in FIGS. 11 or 13. A color image is separated into R (red), G (green) and B (blue) components or Y (luminance component) and I and Q (color component) signals. Each component is coded, thereby coding the color image.

Figure 17:
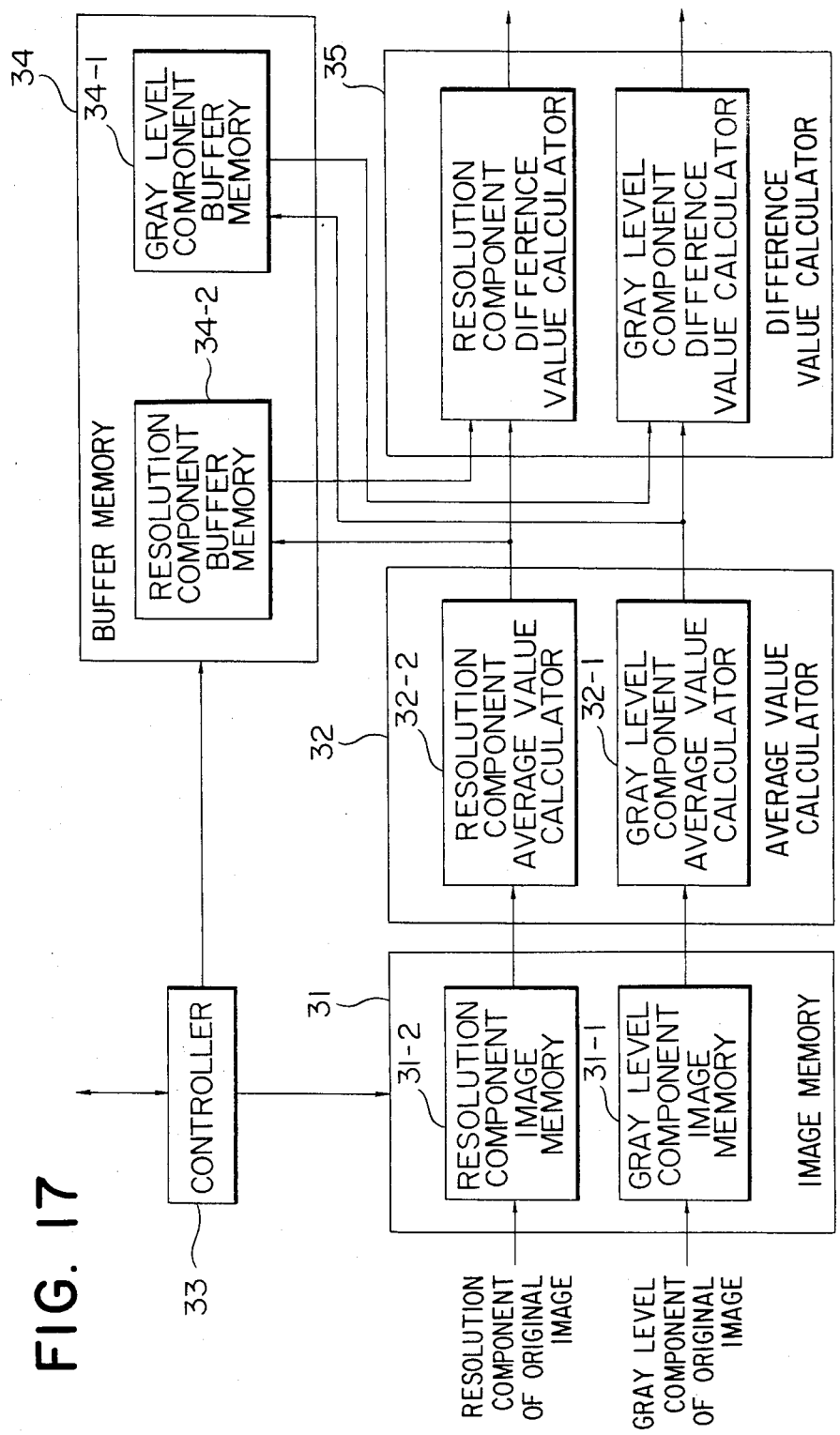
FIG. 17 is a block diagram showing still another arrangement of the coder when the original image information is processed in the gray level and resolution components in accordance with block truncation coding.

When an original image is separated into gray level components and resolution components in accordance with the block truncation coding method so as to perform hierarchical structure formation and difference component coding, as shown in FIG. 1B, basically the same coder as described above can be used. FIG. 17 shows a coder for coding an original image after the original image is separated into two types of components in accordance with the block truncation coding method. This coder comprises an image memory 31, an average calculator 32, a buffer memory 34 and a difference value calculator 35. The image memory 31 comprises resolution and gray level component image memories 31-1 and 31-2. The average calculator 32 comprises resolution and gray level component average value calculators 32-1 and 32-2. The buffer memory 34 comprises resolution and gray level component buffer memories 34-1 and 34-2. The difference value calculator 35 comprises resolution and gray level component difference value calculator 35. The image memory 31 stores data obtained by coding an original image in accordance with the block truncation coding method described with reference to FIG. 2. More particularly, the resolution and gray level components of level 0 shown in FIG. 2 are stored in the resolution and gray level component image memories 31-1 and 31-2. The resolution component average value calculator 32-1 calculates the operation in accordance with equation (4), and the gray level component average value calculator 32-2 performs the operation in accordance with equation (5). The resolution component difference value calculator 35-1 performs the operation shown in FIG. 3 in accordance with equation (6). The gray level component difference value calculator 35-2 performs the operation shown in FIG. 4 in accordance with equation (7).

In the above embodiment, the difference value is used as the code. However, the present invention is not limited to such a scheme, but can be extended to a scheme incorporating any highly efficient data compression coding technique.

It is apparent that the functions of the average value calculator, the difference value calculator and the controller can be easily realized in accordance with conventional digital electronic techniques. These circuits can be arranged by TTL circuits or a combination of a general-purpose microprocessor and a control program. The buffer memory comprises a pair of RAMs each having a memory capacity which allows storage of pixel values of one block, and a selector for selecting a read/write signal for setting one of the RAMs in the read mode and the other in the write mode and for selecting an address signal. The image memory comprises a RAM having a memory capacity which stores pixel values of one block.

The coder described above encodes image information such as aerophotographic information having a wide range. However, the present invention can also be extended to process a global image constituted by independent local images.

Decoder

Figure 18:
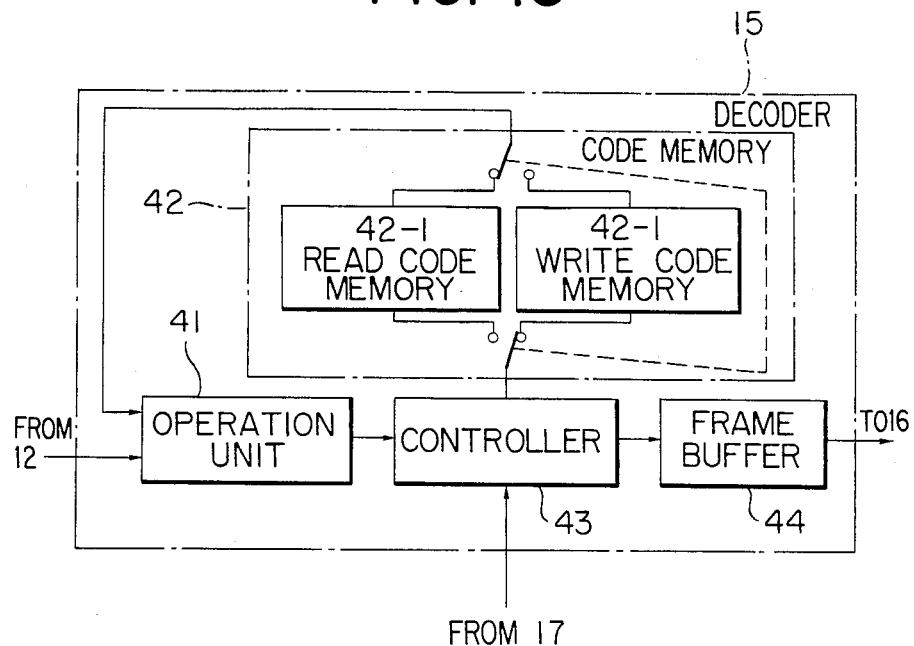
FIG. 18 is a block diagram showing an arrangement of the apparatus of FIG. 6.
Figure 19:
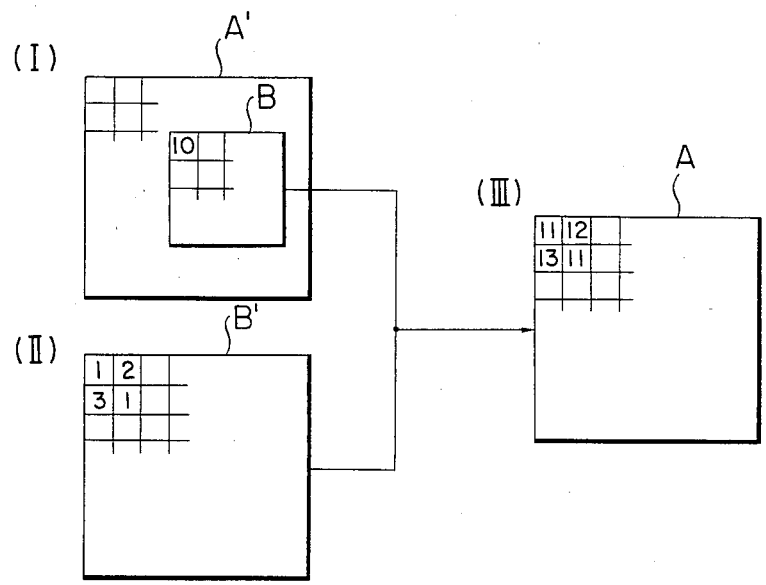
FIG. 19 is a representation for explaining decoding of the image information.

FIG. 18 is a block diagram showing an arrangement of the decoder 15. The decoder 15 comprises an operation unit 41, a code memory 42, a controller 43 and a frame buffer 44. FIG. 19 is a representation showing an input coded image and an output decoded image with respect to the decoder 15. Large square A is a display area of the display unit 16; and B, an area designated by the input unit 17. Small squares arranged in a matrix form represent pixels, respectively. Each numeric value in the pixel represents a code value.

The operation of the decoder will be described in more detail with reference to FIGS. 18 and 19. The code memory 42 comprises two memories 42-1 and 42-2 which are operated independently of each other. One of the two memories 42-1 and 42-2 is set in the read mode (read side), and the other is set in the write mode (write side) Each time one-level decoding is completed, the read and write modes are alternately switched over. In the initial state, the read memory is cleared to zero. At the beginning of decoding, the codes of the highest level are sequentially supplied to the operation unit 41. At the same time, the controller 43 controls to read out the content of the read memory. However, since the content supplied to the operation unit 41 is set to zero, the code of the highest level is stored in the write memory as it is (i.e., as the code shown in A' of FIG. 19(I)). The output code is stored as decoded image information in the frame buffer 44. The display unit 16 reads out the content of the frame buffer 44 and displays the image of the highest level. When the operator enters an instruction to designate a partial area in the display screen at the input unit 17, the next decoding operation is started. Here, the read and write sides of the code memory 42 is reversed. When the designated area is given as B of FIG. 19(I), the pixel values of the area B are read out from the code memory 42. These pixel values are sequentially supplied to the operation unit 41 together with the difference codes B' transmitted from the central processor 11 and are combined therewith. In this case, when difference codes are obtained for a level (immediately lower level) adjacent to the level (highest level) subjected to immediately preceding decoding, four pixels in B' of FIG. 19(II) correspond to one pixel of B of FIG. 19(I), thereby combining and decoding the image information with the image in A of FIG. 19(III). The decoded image information is stored in the frame buffer 44 and in the write side of the code memory 42. Such information is used for decoding for the next level. In this manner, basically, decoding is repeated between two adjacent levels. However, when difference codes between levels separated by not less than two levels are decoded, e.g., when the difference codes of the level lower by two levels than the immediately lower level are transmitted, the controller 43 controls read operation such that one pixel in B of FIG. 19(I) corresponds to 16 pixels in B' of FIG. 19(II).

When the operation unit 41 comprises two-input AND gates corresponding to the number of pixels in each block, a plurality of pixels can be simultaneously processed. The controller 43 can be arranged in accordance with the conventional logic circuit techniques. The operation unit 41 an the controller 43 can be realized by a combination of a general-purpose microprocessor and a control program. The code memory 42 comprises a pair of RAMs each having a memory capacity which allows storage of at least a basic number of codes, and a selector for selecting a read/write signal for setting one of the RAMs in the read mode and the other in the write mode and for selecting an address signal. The frame buffer 44 comprises a RAM having a memory capacity which stores pixel values corresponding to one frame of the display unit 16.

Figure 20:
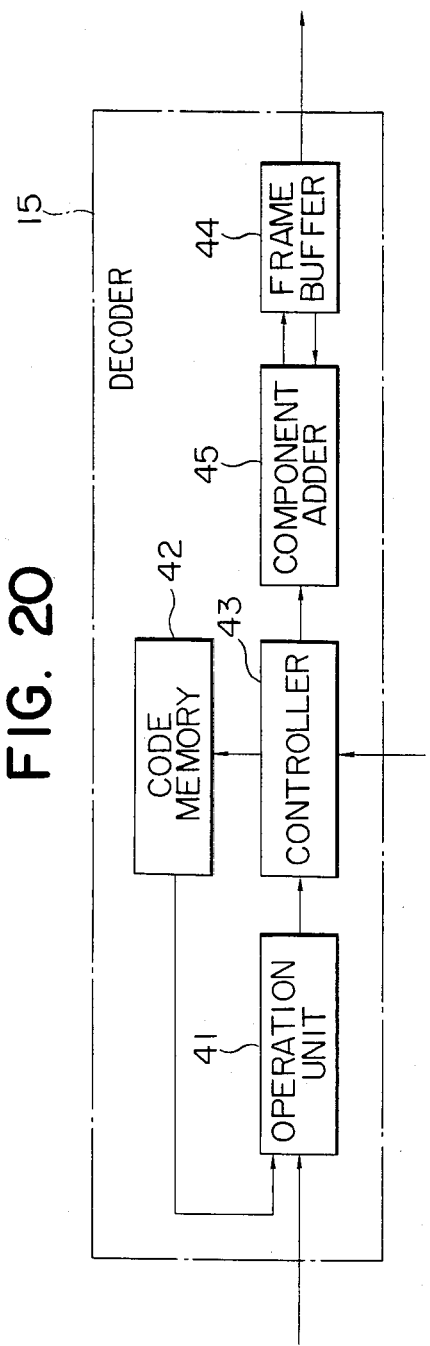
FIG. 20 is a block diagram showing another arrangement of the decoder for decoding color image information.

The monochromatic multi-value image information decoder is exemplified in the above description. However, the arrangement of the decoder is not limited to this. As shown in FIG. 20, a component adder 45 is added to the arrangement shown in FIG. 18. In color image information consisting of red, green and blue color components, for example, the red component is first decoded, and a decoded red component is temporarily stored in the frame buffer 44. A green component is then decoded, and a decoded green component is combined with the decoded red component in the frame buffer 44. A composite R-G component is stored in the frame buffer 44. Finally, the blue component is decoded, and the decoded blue component is combined with the R-G component. The above operation can also be applied to a color image consisting of Y, I and Q signals. As a result, the coded color image information can be properly decoded.

Figure 21:
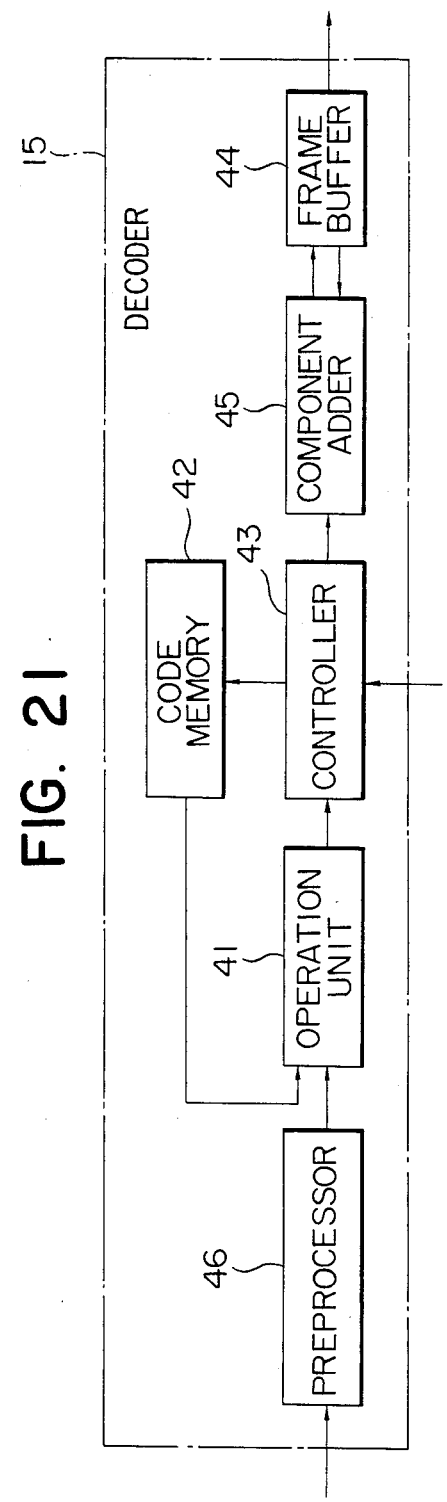
FIG. 21 is a block diagram showing still another arrangement of the decoder when the image information is compressed and coded.

When a compressed code is used, as shown in FIG. 21, a preprocessor 46 is inserted in front of the operation unit 41 in the decoder 15. The compressed code is expanded, and the normally coded information is supplied to the operation unit 41, thereby decoding the compressed codes arranged in the hierarchical structure.

The decoder described above decodes image information such as aerophotographic information having a wide range. However, the present invention can also be extended to process a global image constituted by independent local images.

According to the image information decoder of the present invention, the hierarchical codes as a set of codes from the global image codes to the local image codes can be decoded to display a global image or a local image as a partial area of the global image on the entire screen of the display unit. Furthermore, the previously decoded information is combined with the corresponding difference information to sequentially decode the local image. In this sense, the number of codes to be transmitted can be decreased. Furthermore, in a 4×4 pixel block, the difference value between each 1×1 pixel subblock and the average value of a 2×2 pixel subblock can be added and decoded. In this manner, the difference value of a level separated by not less than two blocks from a given level subjected to decoding and the average value of the block of the given block can be combined and decoded. Then, an image similar to the local image can be decoded and displayed at high speed. Therefore, such similar image allows fast and easy retrieval of a desired image.

What is claimed is:

1. An image information retrieval/display apparatus, comprising:

coded image information storage means for storing coded image information arranged in a hierarchical structure having different levels of coded information corresponding to different resolutions of the image, the coded image information at levels excluding a highest level among the different levels in the hierarchical structure being coded difference information obtained such that a difference between the coded image information of a given level and the coded image information of a level adjacent to the given level is coded;

decoding means for decoding the coded image information of a predetermined level which is read out from said coded image information storage means and generating display image information;

displaying means for displaying the display image information decoded by said decoding means;

designating means for designating a desired partial area within an image of the predetermined level which is displayed on said displaying means; and readout means for reading out from said coded image information storage means at least part of the coded image information which corresponds to the partial area designated by said designating means and which belongs to a level which is at least one lower than the predetermined level, said decoding means comprising extracting means for extracting a decoded image information portion from the display image information displayed on said displaying means, the image portion corresponding to the partial area designated by said designating means, and combining means for combining the information extracted by said extracting means and the difference information of at least one lower level which is read out from said readout means to produce new display image information of the designated partial area, whereby the hierarchically coded image information is repeatedly retrieved and displayed from the high level to the low level in a manner in which a local image can be reproduced at high speed.

2. An apparatus according to claim 1, wherein the coded image information stored in said coded image information storage means is coded and divided into gray level components and resolution components in accordance with block truncation coding.

3. An apparatus according to claim 2, wherein in order to perform decoding of an intermediate image displayed while coded image information in the hierarchial structure is sequentially retrieved from the high level to the low level, only the lower level resolution component as part of the difference information of the designated partial area is added to the decoded image information already retrieved/displayed, thereby peforming retrieval/display of the intermediate image at high speed and decreasing the time required for discrimination as to whether the partial area is properly designated.

4. A image information coder for coding the information stored in said coded image information storage means in said image information retrieval/display apparatus of claim 1, comprising:
first means for receiving image information having a pixel matrix, dividing the pixel matrix into blocks each having a smaller pixel matrix, calculating an average value of luminance signals of the pixels in each block, and coding an average value; and
second means for dividing each block into subblocks each having a still smaller pixel matrix, calculating a difference between an average value of luminance signals of pixedls in a given subblock and the average value of the block including the given subblock and coding the difference, the subblock in said second means being rewritten as a block, thereby repeating coding by said second means.

5. A coder according to claim 4, wherein the image information supplied to said first means comprises gray level and resolution components coded by block truncation coding, and said first and second means being constituted by first gray level and resolution component processing units and second gray level and resolution component processing units, respectively.

6. A coder according to claim 4, wherein the image information comprises color image information which is divided into sets of pixels in units of red, green and blue components, said first and second means being used for the sets of pixels.

7. A coder according to claim 4 further comprising third means for checking variance in all differences between the average values of blocks and the average values of the subblocks included in the respective blocks, coding the subblocks by said second means when the variance exceeds a predetermined value but coding the subblocks with one difference as a representative value and differences between the representative value and another difference or all subblocks with a zero difference when the variance does not exceed the predetermined value, the subblocks in said second and third means being rewritten as blocks, thereby repeating coding by said second and third means.

8. A coder according to claim 7, wherein the image information comprises color image information which is divided into sets of pixels in units of red, green and blue components, said first to third means being used for the sets of pixels.

9. A method of coding image information to be stored in a coded image information storage means in an image information retrieval/display apparatus, comprising the steps of:
dividing original image information, having pixels arranged in a matrix, into blocks each having pixels in a smaller matrix than that of the original image information, processing and coding luminance signals of the pixels belonging to the respective blocks to obtain gray level components, coding gray level distribution of the blocks to obtain resolution components;
calculating average values of the gray level and resolution components in units of a plurality of said blocks, and processing one block of said blocks having the average values to produce high-level gray level and resolution components;
calculating differences between the gray level components of every two adjacent levels and between the resolution components of every two adjacent levels to produce difference gray level and resolution components, respectively; and
supplying the gray level and resolution components for a highest level and the difference gray level and resolution components for the levels excluding the highest level to said coded image information storage means.

10. The image information decoder for decoding image information in said image information retrieval/display apparatus of claim 1, comprising:
temporary storage means for temporarily storing decoded image information;
extracting means for extracting a portion of the image information designated by the designating means from the image information of a given level which is stored in said temporary storage means; and
generating means for combining difference information between the given level of information and a lower level of information with the given level of information and generating decoded image information of the lower level.

11. A decoder according to claim 10, wherein the image information comprises color image information which is divided into sets of pixels in units of red, green and blue components, and said temporary storage means, said extracting mean and said generating means are arranged to decode each of the red, green and blue components, and said decoder further comprises component combining means for combining the red, green and blue components into a color image signal.

12. A coder according to claim 4, wherein the image information comprises color image information which is divided into sets of pixels in units of luminance, quadrature and in-phase components, said first and second means being used for the sets of pixels.

13. A coder according to claim 7, wherein the image information comprises color image information which is divided into sets of pixels in units of luminance, quadrature and in-phase components, said first to third means being used for the sets of pixels.

14. A decoder according to claim 10, wherein the image information comprises color information which is divided into sets of pixels in units of luminance, quadrature and in-phase components, and said temporary storage means, said extracting means and said generating means are arranged to decode each of the components, and said decoder further comprises component combining means for combining the components into a color image signal.

* * * * *